Aug. 19, 1952     H. O. McMAHON     2,607,572
PACKED COLUMN FOR CONTACTING TWO FLUID PHASES
Filed June 11, 1946                                    3 Sheets—Sheet 1
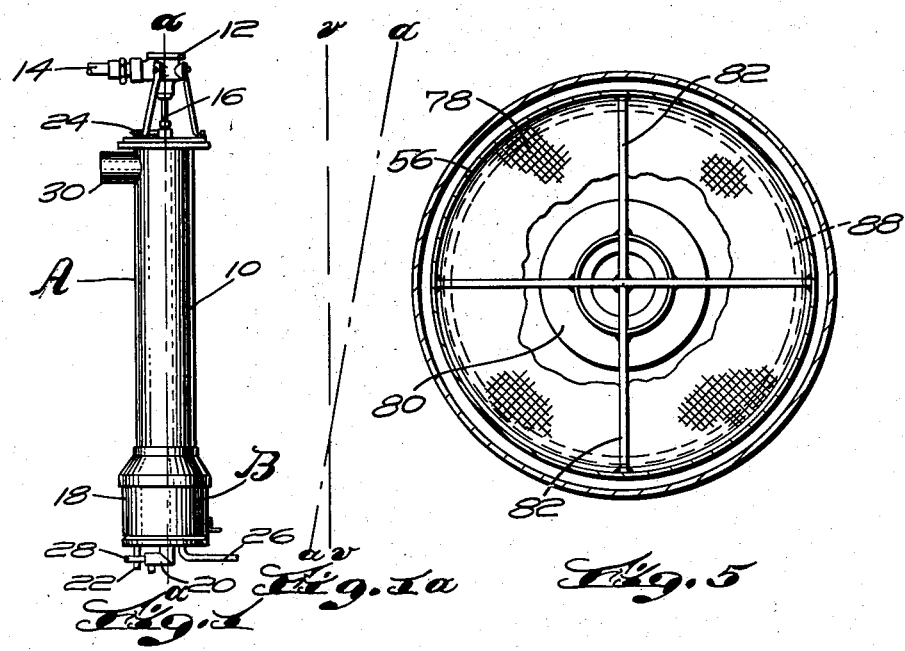
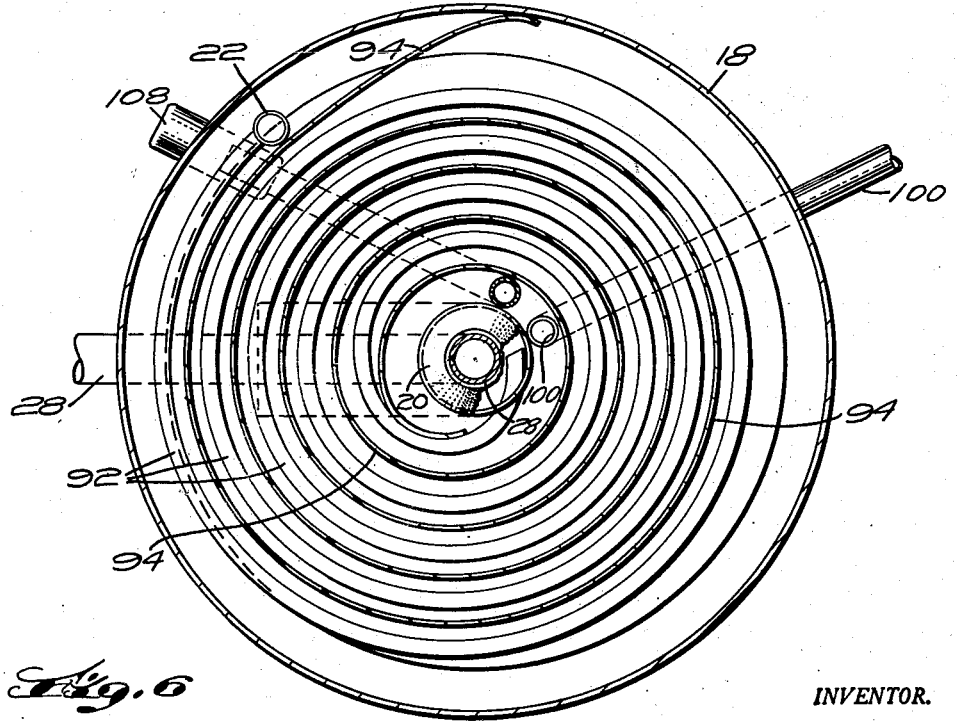
INVENTOR.
Howard O. McMahon
BY Harry Dexter Peck
Attorney Aug. 19, 1952     H. O. McMAHON     2,607,572
PACKED COLUMN FOR CONTACTING TWO FLUID PHASES
Filed June 11, 1946     3 Sheets-Sheet 2
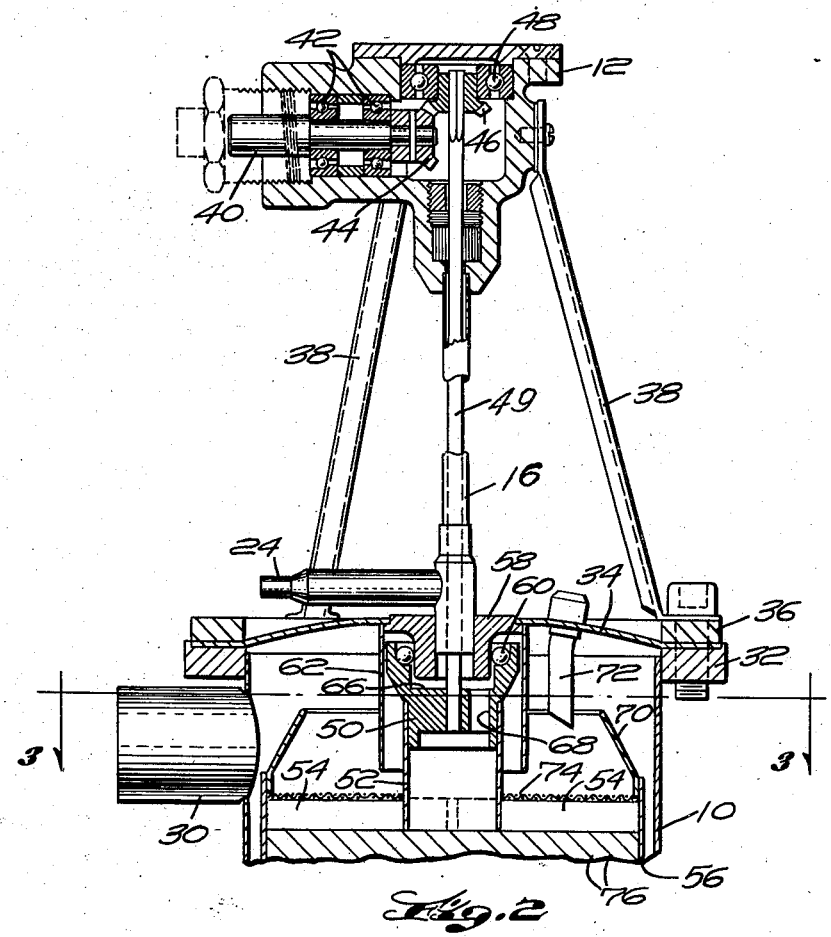
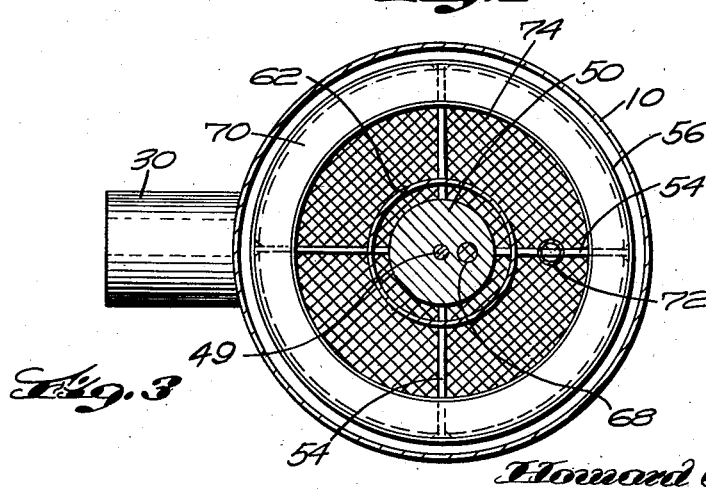
INVENTOR.
Howard O. McMahon
BY
Harry Dexter Peck
Attorney

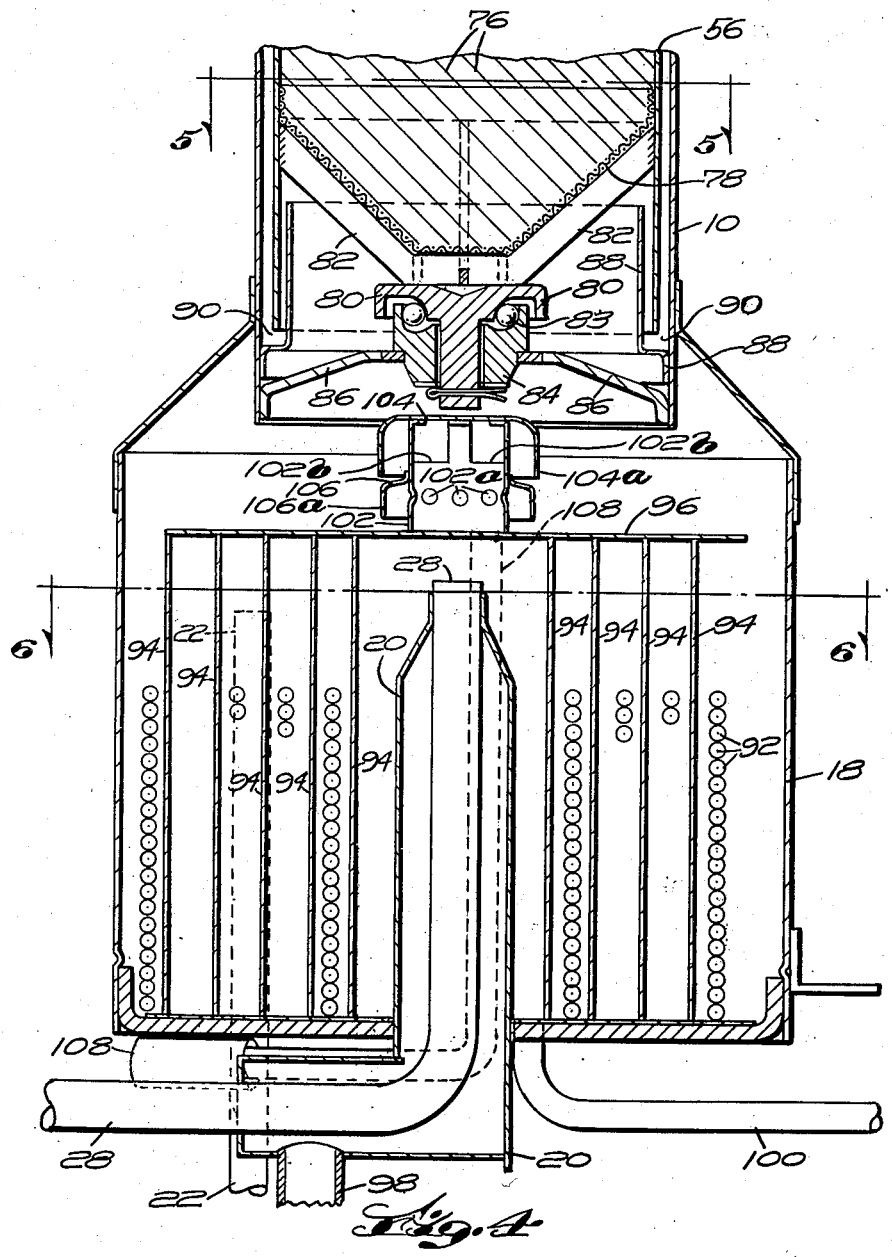

UNITED STATES PATENT OFFICE 2,607,572

PACKED COLUMN FOR CONTACTING TWO FLUID PHASES

Howard O. McMahon, Lexington, Mass., assignor, by mesne assignments, to Arthur D. Little, Inc., Cambridge, Mass., a corporation of Massachusetts Application June 11, 1946, Serial No. 676,075

5 Claims. (Cl. 261—83)

This invention relates to improvements in a packed column for contacting two fluid phases. Such a column may be a fractionating column, an absorption or an extraction tower, one used for humidification or dehumdification, or any like column wherein liquid and gas are to be brought into intimate contact. The invention will be particularly described herein in its application to a fractionating column used for the separation and distillation of liquefied fluids of different boiling points, or more specifically the production of substantially pure oxygen from liquefied air as described in the copending application for patent, Serial No. 674,670, filed June 6, 1946, now Patent 2,553,550, dated May 22, 1951, by Samuel C. Collins and Howard O. McMahon.

In all packed columns the liquid is introduced at the top and permitted to descend in counter flow to the gases or vapors which pass upward through the column. It is highly essential that the flow of the liquid be distributed as nearly uniformly as possible because non-uniform distribution results in a marked decrease in the efficiency of the column. For this reason the conventional column must be maintained vertical in order to perform satisfactorily. Even if tilted slightly the force of gravity acting on the liquid will cause it to accumulate, at least to some extent, at one side of the column and produce non-uniform distribution. In some instances rotating columns have been used but, so far as I am aware, have been rotated at a sufficiently high speed to effect a desired fluid motion by means of the centrifugal force generated. This usually involves the repeated outward flow of the liquid on the highly moving parts of the column and intermediate returns of the liquid along stationary parts to near the axis of the column. Most such rotating columns are not adapted to employ packing which is exceedingly effective in the distribution of the liquid and its exposure to the rising gas.

It is an object of the present invention to provide a simple yet highly efficient method for intimately and uniformly contacting liquid and gas in a packed column. Structurally it is an object of the invention to provide a packed column which can be rotated and which will function with greatest efficiency when tilted and rotated slowly about its axis. The effect of tilting may be attained by intially mounting the column with its axis of rotation fixed in a tilted relation to the vertical or by mounting the column in a vertical position on a base or support which can be tilted when the column is in use. Because the improved column functions so effectively when tilted it is especially applicable for use on aircraft, ships or moving land vehicles.

The tilting causes the relation between the force of gravity and the axis of the column to be continuously changing, hence the liquid instead of draining over towards one side moves generally downward in a sort of helical path, the axis of which is parallel to that of the column. Thus the liquid path length is greater than when the column is vertical and so the liquid and gas are exposed to each other for a longer period of time whereby a more efficient exchange is effected. The speed of rotation is so slow that no effective centrifugal force acts upon the liquid, indeed the purpose of rotating the column is not to utilize any centrifugal force but merely to achieve a constantly changing relation between the force of gravity and the axis of the column.

It is a feature of the improved column that it comprises two thin-walled cylindrical shells, the inner of which contains the packing and is rotated about their common axis. Another important feature resides in the novel seal at the bottom of the rotating shell which prevents the escape of any gas upward through the annular space between the shells.

The best mode in which I have contemplated applying the principles of my invention is shown in the accompanying drawings, but these are to be taken primarily as illustrative for it is intended that the patent shall cover by suitable expression in the appended claims whatever features of patentable novelty exist in the improvements disclosed.

In the accompanying drawings:

Fig. 1 is an elevation, at greatly reduced size, of a column embodying my improvements;

Fig. 1a is a diagrammatic showing of the axis of rotation with respect to the vertical;

Fig. 2 is an elevation, partly in medial section, of the upper portion of the column;

Fig. 3 is a horizontal section taken as on line 3—3 of Fig. 2;

Fig. 4 is an elevation, largely in medial section, of the lower portion of the column;

Fig. 5 is a horizontal section taken as on line 5—5 of Fig. 4; and

Fig. 6 is also a horizontal section taken on line 6—6 of Fig. 4.

For purposes of description, the column will be described as it may be used with apparatus for producing oxygen from air but it is to be understood that its use is not so limited for it may be employed to effect contact between other liquids and other gases and supply other products.

Referring now to Fig. 1, the column A comprises a cylindrical casing or shell 10 with a housing 12 mounted on the top thereof and containing mechanism for transmitting motion from a flexible shaft 14 to a shaft extending into the column through a sleeve 16. At the bottom of the shell 10 the casing may diverge outward and then extend downward to form a housing 18 for a boiler B. As will appear in more detail later compressed air is brought to a central manifold 20 and after moving through the boiler leaves the column through another manifold 22 as liquid air. This is eventually expanded and returned to the top of the column through an inlet 24, whence is passes downward in the column in the process of rectification. Oxygen collects in the base of the column and may be drawn therefrom as liquid through an outlet 26, or oxygen gas may be taken from the boiler through a pipe 28 extending within the central manifold 20. The waste gases or effluent, consisting primarily of nitrogen and argon, pass upward in the column to be discharged therefrom through an outlet 30.

The top edge of the shell 10 (see Fig. 2) has a ring 32 secured thereto and to which is clamped the edge of a dished cover 34 by a second ring 36. To the latter are clamped three struts 38 which support the housing 12 for the transmission mechanism. This comprises a shaft 40 (to which the flexible driving shaft 14 can be connected) mounted in ball bearings 42 and carrying a mitre gear 44 which meshes with another mitre gear 46 supported by a ball bearing 48. A shaft 49 extends from the mitre gear 46 to a hub 50 secured to a supporting tube 52 which is connected by thin arms 54 (see Fig. 3) with an inner rotatable shell 56. Between the rotatable hub 50 and a fixed bearing 58 at the center of the cover plate 34 is a ball bearing 60. A baffle tube 62, secured to the edge of the fixed bearing 58, depends alongside the rotatable hub 50 and part way down beside the supporting tube 52. Upon the shaft 40 being driven from any suitable source of power the motion is transmitted by the gears 44 and 46, shaft 49, hub 50, tube 52 and arms 54 to the inner shell 56, causing the latter to be rotated.

Between the housing 12 and the fixed bearing 58 is the fluid tight encasing sleeve 16 to the lower end of which is attached the tubular inlet 24 for liquid air. The outer end of this inlet is connected by a tube or pipe (not shown) with an expansion device through which liquid air under high pressure passes and thus reaches the inlet at considerably lower pressure. This liquid air flows into the sleeve 16, around the shaft 49 and enters a small chamber 66 formed in the top of the rotatable hub 50, the latter having a hole 68 therethrough whereby the liquid air can flow downward through the supporting tube 52 and reach the interior space of the rotating shell. Around the upper edge of the rotatable shell is secured a baffle shield 70 which converges toward the axis of the column. Within the open space between the top edge of this baffle shield and the baffle tube 62 extends an auxiliary inlet fitting 72 to which a tube (not shown) may be connected for inflow of liquid air. This auxiliary inlet is used in the apparatus disclosed in the aforesaid Collins and McMahon application during the liquefaction period when liquid air is accumulated in the boiler just prior to the oxygen producing operation of the apparatus.

Below a screen 74 at its upper end the inner rotatable shell is filled with packing such as Berl saddles or other suitable material. I have found that if fine wire mesh cloth is cut into square pieces of about ¼" on a side and these pieces are then shaped like the well-known Berl saddles, a most satisfactory packing is provided. Such a packing is represented in the drawings by the widely separated hatch lines 76 drawn across the space of the rotatable shell.

The packing extends to another screen 78 which, as shown in Fig. 4, is preferably of conical configuration and extends from the inner wall of the rotatable shell 56 to a rotatable hub 80, from which thin supporting struts 82 extend to the wall of the rotatable shell just below the screen. The hub 80 rests on a ball bearing 83 carried by a fixed bearing 84 mounted on arms 86 whose outer ends are secured to the bottom of the fixed outer cylindrical shell 10 of the column.

It is to be noted that the inner rotatable shell 56 extends below the lower screen 78 and the supporting struts 82. Just below the bottom edge of this inner shell there is secured to the fixed outer shell 10 a third shell 88 which extends inward from the outer shell below the bottom edge of the rotatable shell and then bends upward to project an appreciable distance inside the rotatable shell 56. Thus there is formed between the fixed outer shell 10 and the fixed third shell 88 a relatively deep trough 90 into which the lower end of the rotatable shell 56 projects. This trough becomes more or less filled with liquid which provides a highly efficient seal at the bottom end of the rotatable shell and prevents the escape of any gas or vapor into the annular space between the fixed and rotatable shells. This liquid seal has such a depth that the column will operate satisfactorily even when tilted from the vertical as much as fifteen degrees.

The boiler B below the column may be of any conventional type wherein the liquid falling from the column is caused to boil and the resulting vapors are returned either in whole to the column, or in part to the column and in part are withdrawn from the boiler as gas or liquid. The boiler may be built integrally with the column so as to tilt when the column is tilted, or it may be arranged vertically while the column may be at an angle from the vertical. Particularly advantageous is the boiler described in my copending application, Serial No. 674,521, filed June 5, 1946, now Patent 2,494,304, dated January 10, 1950, and which is illustrated in the accompanying drawings in a modification particularly adapted to a structure wherein it tilts simultaneously with the fractionating column.

The boiler shown comprises a number of long slender tubes 92 extending from the central manifold 20 (see Fig. 6) to the discharge manifold 22. These tubes lie in a spiral channel formed by a spirally disposed plate 94. Across the top edges of the convolutions of this spiral plate is a cover plate 96. Air at about 75 pounds' pressure and having a temperature of about 108° K. or −265° F., is fed through a tube 98 into the central manifold 20 and then proceeds to flow through the several tubes 92 (in a clockwise direction as seen in Fig. 6) to the outer manifold 22. During its passage through the tubes this air gives up sufficient heat to cause it to be liquefied so that it leaves the outer manifold 22 as liquid air and is sent on its way to the expansion device, hereinbefore mentioned, whence it finds its way to the inlet 24 at the top of the column.

As the liquid air moves downward in the rotating shell 56 over and through the packing 76, fractionation occurs effecting a very considerable separation of the liquid air into its major components, namely oxygen, and nitrogen and argon. The oxygen for the most part remains in the liquid state and, together with some still liquid nitrogen and argon, continues to move downward and drains through the screen 78 to fall on the cover plate 96 whence it runs to the outer edge of the boiler. There it enters the spiral channel formed by the plate 94 and flows toward the inner end thereof in a counterclockwise direction as seen in Fig. 6.

With the gaseous air moving generally in one direction within the tubes 92 and with the liquid product from the column moving generally in the opposite direction of flow outside the tubes in the spiral channel formed by the plate 94 an effective exchange of heat occurs which, as noted above, causes the gaseous air in the tubes to be transformed into liquid air before reaching the discharge manifold 22. The heat taken from the air is absorbed by the liquid in the channel. Near the entrance end of the channel the heat absorption primarily causes the remaining nitrogen and argon in the liquid product to be vaporized. These vapors rise to the top of the channel and flow backward or clockwise therein to escape around the edge of the plate 96. This counterflow of the nitrogen and argon vapors with respect to the flow of the liquid product is enhanced by the fact that as the liquid product moves onward through the channel more heat is absorbed from the relatively warmer air in the tubes and the oxygen is also vaporized. This occurs with increased rapidity toward the inner end of the channel so that apparently a slight pressure gradient is established at the top of the channel which aids in the rejection and discharge of the nitrogen and argon vapors from the so-called entrance end of the channel.

The result of the elimination of the nitrogen and argon as aforesaid is to bring to the inner end of the channel, around the inner or central manifold 20, both a liquid and a gas exceedingly rich in oxygen, indeed substantially pure oxygen. The thus enriched gaseous oxygen is withdrawn through the pipe 28 which extends downward through the central manifold. If liquid oxygen is desired it can be taken off through a tube 100 which connects with the bottom of the spiral channel at its inner end. The gases given off in the boiler rise in the column, become progressively depleted in oxygen content, pass out the top side outlet 30, and are utilized for refrigeration purposes in connection with the compressed air being fed to the column.

Despite the fact that gas is formed in the upper portion of the spiral channel below the plate 96, the liquid product from the columns usually rises to a level above this plate. This is entirely permissible if the level does not rise so high as to cause flooding of the column. To insure this, provision is made against the liquid product exceeding a predetermined level.

At the center of the plate 96 is a cylindrical shell 102 having a series of holes 102a in its wall at the desired level, and above this having a series of openings 102b around the top edge of the shell. Across the top of the shell is a cover plate 104 having an outstanding depending skirt 104a extending somewhat below the level of the openings 102b. Below this upper skirt 104a is another baffle plate 106 with its skirt 106a extending below the level of holes 102a. When the liquid in the boiler rises high enough to enter the holes 102a—the skirt 106a preventing any undue splashing into the holes—it enters the shell 102 and flows thence through a pipe 108 down through the boiler to a place where it may be removed from the system, or to a region of higher temperature where the liquid is vaporized and the vapor returned to the column, as shown in the apparatus disclosed in the aforesaid Collins and McMahon application, thus in either case removing the excess of liquid from the boiler. The vapors formed from the liquid when they are returned to the column flow back again in pipe 108 to enter the shell 102 and escape therefrom through the top openings 102b passing under the skirt 104a and joining the other rising vapors on their way to the rotating shell 56. The cover plate 104 and its skirt 104a prevent any of the liquid dropping from the shell 56 from entering the holes 102b.

By arranging the outlet holes 102a relatively close to the axis of the column the permissible level of the liquid in the boiler is not materially changed whether the column is close to the vertical or appreciably tilted therefrom.

Although the column herein disclosed is shown in the drawings as vertical and will operate in this position with satisfactory results, it is to be understood that it will perform with greatest separating efficiency when tilted from the vertical. In Fig. 1 the axis of rotation of the rotatable shell is indicated by the dot-and-dash line a—a, and in Fig. 1a a preferred relationship of this axis with the vertical (indicated by the dot-and-dash line v—v) is shown. When so mounted with the axis of rotation inclined from the vertical the highest degree of separation is attained. This is understood when it is realized that as the liquid descends in the rotating column the angle between the direction of the force of gravity and the axis of the column is continuously changing and the liquid instead of draining over towards one side of the column moves downward in a sort of helical path whose axis is substantially parallel with that of the column, and greater in length than if the column were exactly vertical. The liquid distribution therefore continues uniform throughout the packed section of the column and the descending liquid and rising vapors are exposed to each other for a longer period of time, hence a more efficient separation is effected.

The speed of rotation must not be too high otherwise the resulting centrifugal force would sling the liquid out towards the walls of the column and effect a non-uniform distribution. Experience has shown that a speed of 20 R. P. M. or less is desirable depending upon the diameter of the column. In general, the larger the diameter the slower the speed should be in order to avoid centrifugal disturbance of the liquid distribution.

It is evident that the column of this invention may advantageously be mounted in a tilted position, particularly in cases where it is on a relatively stable support which is not subjected to tilting. Thus, if this column is installed in a fixed location in a factory the advantages of this invention are best attained if the column is set at an angle from the vertical. And it may be similarly installed, if desired, on moving vehicles or elsewhere where it, together with the rest of the associated apparatus, is subjected to some tilting in any event. Furthermore, it may be one of a plurality of columns of the same type, arranged one over the other or connected in any other conventional relation, and all capable of being operated in a tilted position.

I claim:

1. A column for contacting liquid gas, comprising an upright elongate tubular shell, packing within said shell consisting of discrete elements having a larger surface area relative to mass, said elements being packed so as to prevent relative movement thereof when said column is rotated, means for supporting said shell for rotation about an upright axis, means for introducing liquid for downward flow through said packing, means for introducing gas for upward flow through said packing, and means for rotating said shell at a speed which produces no effective centrifugal force on said liquid.

2. A column for contacting liquid and gas, comprising a tubular shell, packing within said shell consisting of discrete elements having a large surface area relative to mass, said elements being packed so as to prevent relative movement thereof when said column is rotated, means for supporting said shell for rotation about an axis inclined from the vertical, means for introducing liquid for downward flow through said packing means for introducing gas for upward flow through said packing, and means for rotating said shell at a speed which produces no effective centrifugal force on the liquid, thereby effecting a uniform distribution of said liquid through said packing.

3. A packed column for contacting two fluid phases, comprising an upright elongate tubular shell, packing within said shell consisting of discrete elements having a large surface area relative to mass, said elements being packed so as to prevent relative movement thereof when said column is rotated, means for supporting said shell for rotation about its elongate axis, and means for rotating said shell at a speed which produces no effective centrifugal force acting upon said fluid phases.

4. A packed column for contacting two fluid phases, comprising a tubular shell, packing within said shell consisting of discrete elements having a large surface area relative to mass, said elements being packed so as to prevent relative movement thereof when said column is rotated, means for supporting said shell for rotation about an axis inclined from the vertical, and means for rotating said shell about said axis at a speed which produces no effective centrifugal force upon said fluid phases.

5. A fractionating column for the the separation of the components of a fluid mixture, comprising a tubular shell mounted for rotation about an axis inclined from the vertical and packed with discrete elements having a large surface area relative to mass, said elements being packed so as to prevent relative movement thereof when said column is rotated, means for introducing liquefied components of said fluid mixture into the upper part of said shell, means for introducing gaseous components of said fluid mixture into the lower part of said shell and means for rotating said shell at a speed which produces no effective centrifugal force on the liquid, whereby the liquid moves downwardly with uniform distribution and under the combined influence of gravity and rotation and the gaseous components travel in a generally countercurrent flow relative to said liquid.

HOWARD O. McMAHON.

REFERENCES CITED

The following references are of record in the file of this patent:

UNITED STATES PATENTS

| Number | Name | Date |
|---|---|---|
| 658,725 | Naef | Sept. 25, 1900 |
| 1,607,321 | Van Nuys | Nov. 16, 1926 |
| 1,817,665 | Bailey | Aug. 4, 1931 |
| 2,189,230 | Sheldon et al. | Feb. 6, 1940 |
| 2,317,101 | Lecky | Apr. 20, 1943 |
| 2,317,952 | Burk et al. | Apr. 17, 1943 |
| 2,333,712 | Eckey | Nov. 9, 1943 |
| 2,392,119 | Colbreth | Nov. 1, 1946 |
| 2,400,810 | Clark | May 24, 1946 |

FOREIGN PATENTS

| Number | Country | Date |
|---|---|---|
| 5,916 | Great Britain | Mar. 29, 1900 |
| 1,380 | Great Britain | Jan. 27, 1916 |
| 348,224 | Great Britain | May 14, 1931 |